US006868232B2

(12) United States Patent
Eijk et al.

(10) Patent No.: US 6,868,232 B2
(45) Date of Patent: Mar. 15, 2005

(54) FAST PROTECTION SWITCHING BY SNOOPING ON UPSTREAM SIGNALS IN AN OPTICAL NETWORK

(75) Inventors: Peter Van Eijk, Eemnes (NL); Reed K. Even, Livingston, NJ (US); Piet Van Hevingen, Almere (NL); Song Jiang, Whippany, NJ (US); Kyeong-Soo Kim, San Jose, CA (US); Woojune Kim, Seoul (KR); Fengkun Liu, Great Neck, NY (US); Yong-Kwan Park, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 475 days.

(21) Appl. No.: 09/781,864

(22) Filed: Feb. 12, 2001

(65) Prior Publication Data

US 2002/0109876 A1 Aug. 15, 2002

(51) Int. Cl.[7] .......................... H04B 10/00; H04B 10/08
(52) U.S. Cl. ............................. 398/5; 398/19; 398/53; 398/67; 398/145; 398/153; 398/154; 398/168
(58) Field of Search ....................... 398/2, 5, 19, 20, 398/47, 53, 67, 99, 102, 145, 153, 154, 156, 168

(56) References Cited

U.S. PATENT DOCUMENTS

| 5,150,247 A | 9/1992 | Sharpe et al. ................ 359/135 |
| 5,357,360 A | 10/1994 | Imhoff et al. | |

(List continued on next page.)

FOREIGN PATENT DOCUMENTS

| DE | 197 37 359 A | 3/1999 |
| EP | 0 597 719 A | 5/1994 |
| EP | 0 607 672 A | 7/1994 |
| EP | 0 644 704 A | 3/1995 |

OTHER PUBLICATIONS

PON–based All Fiber–optic Access System For High–speed Multimedia Services, Ashi et al., Hitachi Review, vol. 48 [1999], No. 4.*

(List continued on next page.)

Primary Examiner—M. R. Sedighian
Assistant Examiner—Nathan Curs

(57) ABSTRACT

An optical network has an optical splitter connected to (1) a working optical subscriber unit (OSU) of a working circuit via a working optical fiber, (2) a protection OSU of a protection circuit via a protection optical fiber, and (3) one or more optical network terminals (ONTs). The present invention enables fast protection switching from the working OSU to the protection OSU. In one embodiment, the arrival times of corresponding upstream ranging reply PLOAM cells are measured at both the working and protection OSUs during ranging operations of the working OSU. In another embodiment, a cell delineation procedure is initiated at the protection OSU during normal, non-ranging operations of the working OSU to enable the protection OSU to correctly delineate upstream cells and the arrival times of corresponding upstream cells are then measured at both the working and protection OSUs. In either case, a propagation delay value is generated based on the measured arrival times for use by the protection OSU for communications with the one or more ONTs if and when protection switching is implemented upon detection of a failure in the working circuit, possibly without requiring the protection OSU to perform any ranging for the one or more ONTs.

22 Claims, 12 Drawing Sheets

PARTIAL DUPLEX SYSTEM

U.S. PATENT DOCUMENTS

| | | | |
|---|---|---|---|
| 5,398,129 A | 3/1995 | Reimann | 359/137 |
| 5,523,870 A | 6/1996 | Suzuki et al. | 359/139 |
| 5,537,241 A | 7/1996 | Fisher | 359/137 |
| 5,539,564 A | 7/1996 | Kumozaki et al. | 359/161 |
| 5,541,962 A * | 7/1996 | Yoshino | 375/354 |
| 5,680,234 A | 10/1997 | Darcie et al. | 359/110 |
| 5,854,701 A | 12/1998 | Clarke et al. | 359/137 |
| 5,872,645 A | 2/1999 | Proctor | 359/136 |
| 6,023,467 A | 2/2000 | Abdelhamid et al. | |
| 6,108,112 A | 8/2000 | Touma | 359/110 |
| 6,288,806 B1 | 9/2001 | Touma et al. | 359/110 |
| 6,327,400 B1 | 12/2001 | Harstead et al. | 385/22 |
| 6,414,768 B1 | 7/2002 | Sakata et al. | 359/119 |
| 6,498,667 B1 | 12/2002 | Masucci et al. | 359/157 |
| 6,563,613 B1 | 5/2003 | Tochio | 359/110 |
| 6,636,527 B1 | 10/2003 | Lee et al. | 370/465 |
| 2002/0030875 A1 * | 3/2002 | Kim et al. | 359/168 |

OTHER PUBLICATIONS

" A Study of Contention Resolution Algorithm for ATM–PON System–Double Queue Tree ased Algorithm", by Jong-–Wook Jang et al., ICCT '98, vol. 2, Oct. 22–24 1998, Beijing, China, 5 pp.

"ATM–PON FTTH Access Networks and Services", by Yoichi Maeda, Optical Fiber Communication Conference, OFC/IOOC '99, Technical Digest, vol. 3, Feb. 21–26 1999, pp. 66–68.

"Design and Cost Performance of the Multistae WDM–PON Access Networks" by Guido Maier et al., Lightwave Technology, Journal of Lightwave Tech., Volum 18, Issue 2, Feb. 2000, pp. 125–143.

"Asymmetric ATM–PON Interface Compliant to ITU–T/FSAN Standard for Global Optical Access Systems", by Kazuyuki Tajima et al., APCC/OECC '99, vol. 1, Oct. 18–22 1999, pp. 27–30.

"Full Service Optical Access Networks: ATM Transport on Passive Optical Networks", by Ingrid Van de Voorde et al., IEEE Communications Magazine, vol. 35, Issue 4, Apr. 4, 1997, pp. 70–75.

Redundancy and Protection–Switching in APON Systems, by Jan L. De Groote, Dominique A. Buyse, Hans K. Dedecker, Filip M. Louagie, Hans F. Slabbinck, European Conference on Networks & Optical Communications, Delft, The Netherlands, Jun. 22–24, 1999, pp. 119–126.

"Redundancy and Protection–Switching in APON Systems", De Groote et al., Proceedings of the European Conference on Networks and Optical Communications 1999, Broadband Access and Technology, Amsterdam: IOS Press, NL, vol. Part 1, pp. 119–126.

"A Novel Architecture for Optical Dual Homing Survival Fiber Networks", Tsong–Ho Wu, IEEE International Conference on Communications , SUPERCOMM/ICC '90, Atlanta, GA Apr. 15–19, 1990, vol. 2, pp. 533–539.

* cited by examiner

[1] DOWNSTREAM FRAME BOUNDARIES

[2] DOWNSTREAM RANGING PLOAM CELL

[3] UPSTREAM RANGING REPLY CELL (Td=0)

[4] UPSTREAM RANGING REPLY CELL (Td>0)

[5] UPSTREAM CELL AFTER RANGING

[6] DOWNSTREAM PLOAM CELL WITH GRANTS IN 1st,2nd,3rd TIME SLOT

[7] 3 UPSTREAM CELL IN 1st,2nd,3rd TIME SLOTS AFTER RANGING

[8] EXPANSION OF 3 UPSTREAM CELLS SHOWING POSITION OF bmr RESET PULSE

OLT-ONLY DUPLEX SYSTEM

PARTIAL DUPLEX SYSTEM

TIMING REFERENCE AT WarmOSU

RX_OPT_SIGNAL (OPTICAL SIGNALS RECEIVED BY BURST MODE RECEIVER)

BMR_RESET (BURST MODE RECEIVER RESET SIGNALS-SPACED OUT BY 449/448 BITS)

RX_BMR_DATA (OUTPUT OF BURST MODE RECEIVER)

FIG. 10A
FRAME BOUNDARIES ON WarmOSU AND ProtectOSU (SYNCHRONIZED)

FIG. 10B
DOWNSTREAM PLOAM CELLS (PL1 CONTAINS PLOAM GRANT FOR ONT #1)

FIG. 10C
UPSTREAM RECEPTION OF PLOAM CELL FROM ONT #1 (Td1, Td2=0)

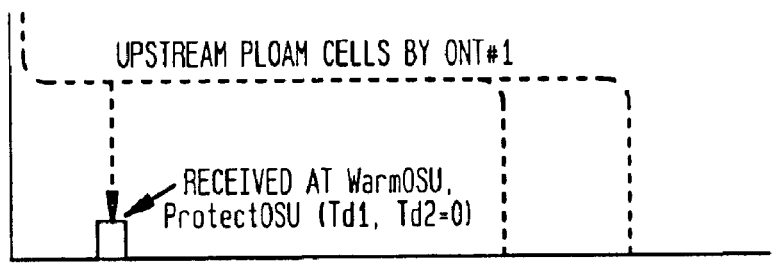

FIG. 10D
UPSTREAM RECEPTION OF PLOAM CELL FROM ONT #1 (Td1>0) AT WarmOSU

FIG. 10E
UPSTREAM RECEPTION OF PLOAM CELL FROM ONT #1 (Td2>0) AT ProtectOSU

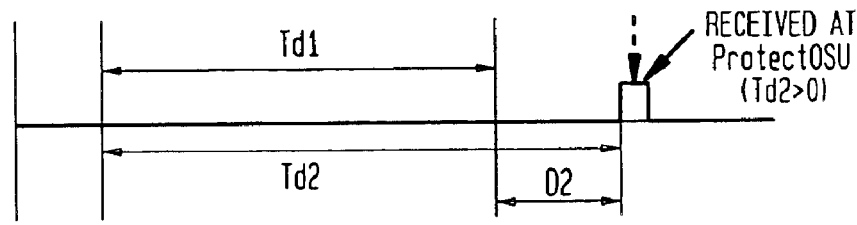

Td1: DELAY MEASURED AT WarmOSU
Td2: DELAY MEASURED AT ProtectOSU
D2: TIME DIFFERENCE BETWEEN START OF FRAME IN WarmOSU AND ProtectSU, DUE TO DIFFERENCE IN DISTANCE TO SPLITTER
*SOF: START OF FRAME

1:N PROTECTION (EXAMPLE N=3)

FAST PROTECTION SWITCHING BY SNOOPING ON UPSTREAM SIGNALS IN AN OPTICAL NETWORK

BACKGROUND OF THE INVENTION

1. Field of the Invention

The present invention relates to telecommunications, and, in particular, to fault protection schemes for optical communication networks.

2. Description of the Related Art

FIG. 1 shows a block diagram of a portion of a passive optical network 100 comprising an optical subscriber unit (OSU) 102, a passive optical splitter 104, and two optical network terminals (ONTs)—ONT #1 106 and ONT #2 108. OSU 102 exchanges optical signals with splitter 104 via bi-directional optical fiber 110, while splitter 104 exchanges optical signals with ONT #1 106 via bi-directional optical fiber 112 and with ONT #2 108 via bi-directional optical fiber 114.

OSU 102 functions as a central hub that transmits downstream optical signals received from a backbone network to splitter 104, which copies and broadcasts the downstream optical signals to both ONT #1 and ONT #2. This broadcasting of downstream optical signals is represented in FIG. 1 by the transmission of a downstream optical signal comprising data packets VC1 and VC2 from OSU 102 to splitter 104 over fiber 110, which passively splits that downstream optical signal into two identical copies for transmission to ONT #1 over fiber 112 and to ONT #2 over fiber 114.

In the upstream direction, ONT #1 and ONT #2 transmit different upstream optical signals over fibers 112 and 114, respectively, to splitter 104, which passively combines and transmits the two upstream optical signals as a single combined upstream optical signal over fiber 110 to OSU 102, which routes the combined upstream optical signal to the backbone network.

In order to avoid the different upstream optical signals generated by the different ONTs from interfering with each other when they are passively combined at optical splitter 104, in one implementation of a passive optical network, the different upstream optical signals from the ONTs are combined based on the principles of time division multiple access (TDMA) multiplexing, in which each ONT is assigned a unique time slot in the combined (i.e., TDMA) upstream optical signal transmitted from splitter 104 to OSU 102. By transmitting information in discrete data packets and by accurately timing the transmission of those data packets from the various ONTs, the arrival of the various data packets at splitter 104 can be orchestrated to coincide with the corresponding time slots in the upstream TDMA optical signal transmitted from splitter 104 to OSU 102. In this way, the different upstream optical signals from the different ONTs can be passively combined by splitter 104 to generate the upstream TDMA optical signal without any interference between data packets from different ONTs. This TDMA multiplexing is represented in FIG. 1 by ONT #1 transmitting a data packet VC3 to splitter 104 via fiber 112 and ONT #2 transmitting a data packet VC4 to splitter 104 via fiber 114 with the timing of those transmissions coordinated such that splitter 104 can passively combine the two upstream optical signals in the optical domain to generate and transmit an upstream TDMA optical signal comprising data packet VC3 followed by data packet VC4 to OSU 102 over fiber 110.

In general, the distance from splitter 104 to each ONT may vary from ONT to ONT. As such, the time that it takes for an upstream optical signal to travel from ONT #1 to splitter 104 may differ from the time that it takes for an upstream optical signal to travel from ONT #2 to splitter 104. In order to ensure accurate TDMA multiplexing using a passive optical splitter, the round-trip duration for transmissions between splitter 104 and each ONT is characterized using a procedure called ranging. During ranging, OSU 102 transmits a special downstream message that causes ONT #1 to transmit a corresponding upstream acknowledgment message back to OSU 102. OSU 102 measures the total round-trip duration from the time of the transmission of the special downstream message until the time of the receipt of the corresponding upstream acknowledgment message from ONT #1. OSU 102 then repeats the same procedure with ONT #2 to measure the total round-trip duration for ONT #2. OSU 102 compares the different measured round-trip durations to generate timing offsets to be applied by the different ONTs when transmitting upstream data packets to splitter 104 to ensure accurate TDMA multiplexing.

Since each ONT may transmit at a different signal power level over an optical fiber having a different length and since optical splitter 104 passively combines the different upstream optical signals received from the different ONTs, the upstream TDMA optical signal that arrives at OSU 102 will, in general, consist of a sequence of data packets, where each data packet may have a different signal power level. In order for OSU 102 to be able to accurately route the different data packets to the backbone network, OSU 102 is configured with a special type of receiver called a burst mode receiver (BMR). One of the characteristics of a BMR is the ability to reset its trigger level (i.e., the threshold for distinguishing between 1s and 0s in a received optical signal) at the beginning of each different data packet in a TDMA optical signal in order to handle the different signal power levels of the different data packets.

FIGS. 2A–D show time lines that demonstrate the capability of a BMR to adjust its trigger level at the beginning of each data packet (i.e., burst). In particular, FIG. 2A shows a time line corresponding to a TDMA optical signal comprising a burst from an ONT w, followed by a burst from a different ONT x, followed by a burst from yet another ONT y, followed by a burst from still another ONT z, where each different burst from each different ONT happens to arrive at the BMR with a different signal power level.

FIG. 2B shows Case (a), where a fixed high trigger level, as shown in FIG. 2A, is used to process each received data packet. In this case, only the data packet from ONT y is accurately decoded. The data packets from the other ONTs are lost, because the high trigger level misinterpreted all of that data as 0s. Similarly, FIG. 2C shows Case (b), where a fixed middle trigger level, as shown in FIG. 2A, is used to process each received data packet. In this case, only the data packets from ONT y and ONT z are accurately decoded. Note that the case of applying a fixed low trigger level (not shown in FIG. 2) may result in 0s being misinterpreted as 1s for data packets having a high signal power level. FIG. 2D shows Case (c), where the BMR uses a variable trigger level, as shown in FIG. 2A, to process each data packet. In this case, the trigger level is dynamically adjusted at the start of each burst of data (i.e., each data packet) to accurately decode each data packet from each different ONT.

As in all telecommunication systems, in order to ensure survivability and restore services following the occurrence of various service-affecting defects, it is desirable to configure networks, such as passive optical network 100 of FIG. 1, with fault detection and protection switching capabilities. To ensure high reliability over a wide range of services, the network should be able to restore services very quickly, usually on the order of 60 to 200 ms. Protection switching functionality should ensure quick restoration of service. Additionally, it should support automatic detection of failures, generically supported by "health check" functions and other suitable protocols.

SUMMARY OF THE INVENTION

The present invention is directed to techniques for providing fast and reliable protection switching in passive optical networks, such as network 100 of FIG. 1, having working and protection circuits. In particular, the present invention is directed to an algorithm where a protection OSU snoops on upstream cells in order to generate timing offsets representing the differences between the working and protection circuits. These timing offsets are then applied by the protection OSU if and when a protection switch occurs from the working circuit to the protection circuit for communications between the protection OSU and the ONTs of the optical network. The present invention enables fast protection switching by accelerating or even eliminating the need for the protection OSU to perform ranging on the ONTs after a protection switch.

In one embodiment, in an optical network comprising an optical splitter connected to (1) a working optical subscriber unit (OSU) of a working circuit via a working optical fiber, (2) a protection OSU of a protection circuit via a protection optical fiber, and (3) one or more optical network terminals (ONTs), the present invention is a method for enabling fast protection switching from the working OSU to the protection OSU, comprising the steps of (a) synchronizing the working and protection OSUs; (b) processing one or more upstream ranging reply PLOAM cells received at the protection OSU during ranging operations of the working OSU; (c) measuring arrival times of corresponding upstream ranging reply PLOAM cells at both the working and protection OSUs; and (d) generating a propagation delay value based on the arrival times for use by the protection OSU for communications with the one or more ONTs if and when protection switching is implemented upon detection of a failure in the working circuit without requiring the protection OSU to perform any ranging for the one or more ONTs.

In another embodiment, in an optical network comprising an optical splitter connected to (1) a working OSU of a working circuit via a working optical fiber, (2) a protection OSU of a protection circuit via a protection optical fiber, and (3) one or more ONTs, the present invention is a method for enabling fast protection switching from the working OSU to the protection OSU, comprising the steps of (a) synchronizing the working and protection OSUs; (b) initiating a cell delineation procedure at the protection OSU during normal, non-ranging operations of the working OSU to enable the protection OSU to correctly delineate upstream cells; (c) measuring arrival times of corresponding upstream cells at both the working and protection OSUs; and (d) generating a propagation delay value based on the arrival times for use by the protection OSU for communications with the one or more ONTs if and when protection switching is implemented upon detection of a failure in the working circuit.

BRIEF DESCRIPTION OF THE DRAWINGS

Other aspects, features, and advantages of the present invention will become more fully apparent from the following detailed description, the appended claims, and the accompanying drawings in which:

FIGS. 10A–E show representations of time lines associated with snooping by the protection OSU on PLOAM cells;

DETAILED DESCRIPTION

ITU-T Recommendation G.983.1

Figure 1:
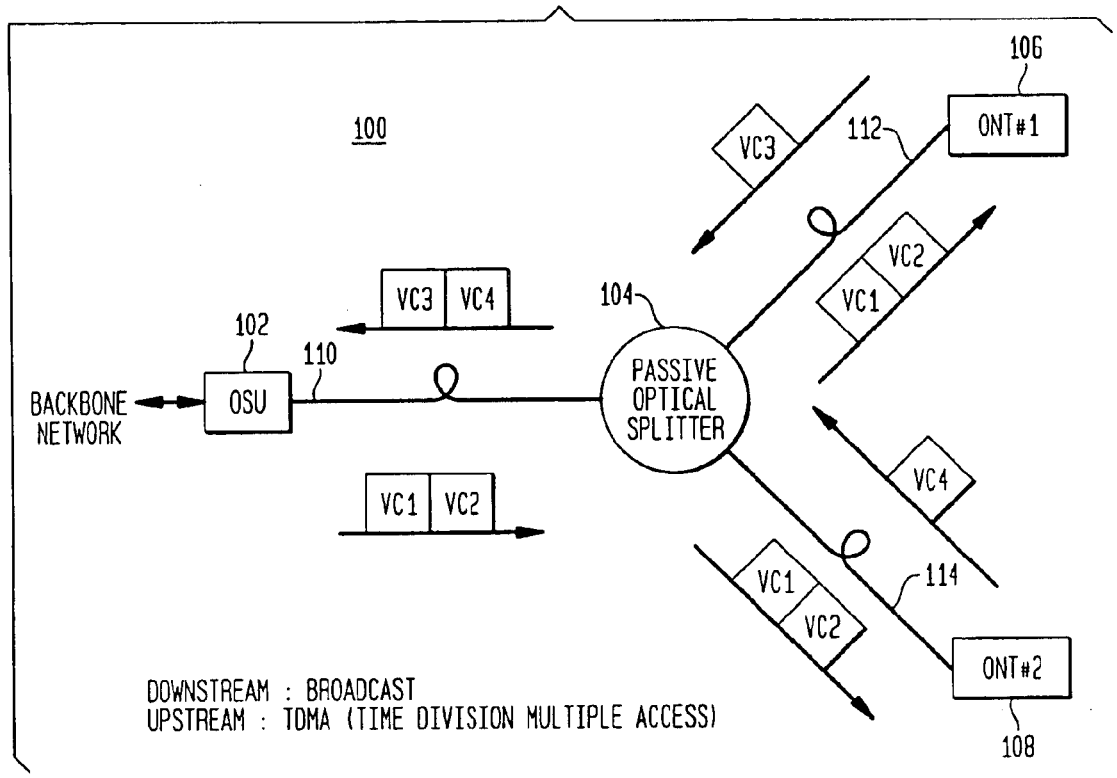
FIG. 1 shows a block diagram of a portion of a passive optical network.
Figure 2A:
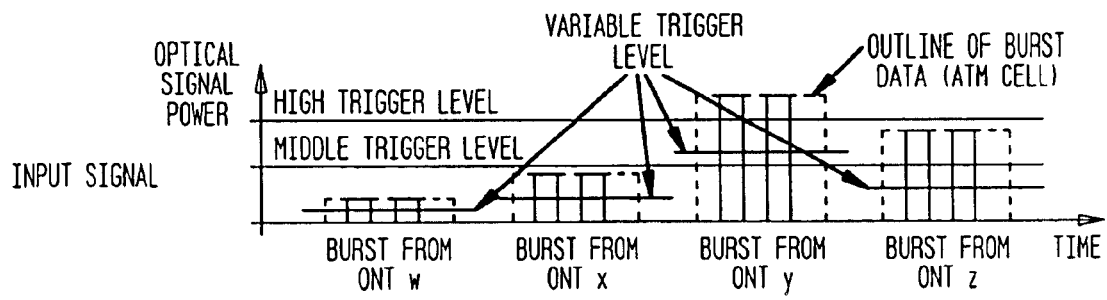
FIGS. 2A–D show time lines that demonstrate the capability of a burst mode receiver to adjust its trigger level at the beginning of each data packet.
Figure 2B:
Figure 2C:
Figure 2D:

ITU-T Recommendation G.983.1 defines a new standard for passive optical networks (PONs) in which fixed-size ATM (Asynchronous Transfer Mode) cells are used for all data transmissions. According to the G.983.1 recommendation, the upstream channel is a TDMA channel that is divided into frames, each frame having 53 time slots. Each time slot may contain a 56-byte upstream cell generated by a particular ONT, where each 56-byte upstream cell comprises a 3-byte overhead followed by a 53-byte cell, which may be a Physical Layer Operations Administration and Maintenance (PLOAM) cell or a conventional ATM cell containing user data. PLOAM cells are special control cells used by the optical subscriber unit (OSU) and the optical network terminals (ONTs) to communicate with one another.

According to the G.983.1 recommendation, the downstream channel consists of a continuous stream of cells, where the stream is transmitted (i.e., broadcast) to all ONTs. The downstream cell stream is divided into frames, each frame having 56 cells and each cell having 53 bytes. At the beginning and the middle of each frame, a special PLOAM cell is inserted. Consequently, each frame in the downstream cell stream is composed of a first 53-byte PLOAM cell, followed by 27 conventional 53-byte ATM cells containing user data, followed by a second 53-byte PLOAM cell, followed by another 27 conventional 53-byte ATM cells containing more user data.

The first PLOAM cell contains 27 grant fields and a 12-byte message field, while the second PLOAM cell contains 26 grant fields and a 12-byte message field. The grants are used to control the upstream data transmission. In particular, each of the 53 different grant fields can be used to identify a particular ONT that has permission to transmit a data packet in the corresponding time slot in the upstream channel during the current upstream frame. There is a one-to-one correspondence between the 53 grant fields in the first and second PLOAM cells of a downstream frame and the 53 time slots in an upstream frame. The G.983.1 recommendation defines different types of grants, including DATA, UNASSIGNED, and PLOAM grants, which are explained in the following paragraphs.

During the process of ranging, each ONT is assigned two unique grants: one for user data cells and one for PLOAM cells. Whenever an ONT sees one of its assigned grant values in a particular grant field of a PLOAM cell, it transmits an appropriate upstream cell (i.e., either an upstream user data cell or an upstream PLOAM cell) for the corresponding time slot of the upstream channel. If the value in a grant field matches the PLOAM grant value for an ONT, then the ONT transmits an upstream PLOAM cell. If the value in a grant field matches the DATA grant value for an ONT, then the ONT transmits either a user data cell (if the ONT has data to transmit) or an idle cell (if the ONT has no data to transmit). If none of the values in the grant fields in the first and second PLOAM cells of a downstream frame match either of the assigned grants for an ONT, then the ONT does not transmit anything during the corresponding upstream frame. Special UNASSIGNED grant values are reserved to indicate that the corresponding time slot in the upstream channel is not assigned, in which case none of the ONTs will transmit an upstream cell for that time slot.

Ranging

In the TDMA processing described above, all ONTs must agree on time slot boundaries. Otherwise, due to the differences in fiber lengths connecting each ONT and the splitter, the upstream cells arriving at the OSU may overlap, in which case the corresponding cell data will be lost. As described earlier, ranging is the process that ensures that the upstream cells do not overlap (i.e., interfere with one another when they are passively combined at the splitter).

In the ranging procedure, to configure the ONTs to transmit upstream, the OSU first broadcasts downstream to all ONTs three upstream overhead messages that define the pattern for the 3-byte overhead used in each 56-byte upstream cell. The contents of this 3-byte overhead are described in further detail below. Second, the OSU sends a SERIAL_NUMBER_MASK message to enable the ONT with matching serial number to react on ranging grants. In this way, it is guaranteed that there will be no more than one ONT that can respond to ranging grants, thereby preventing collisions in ranging response. Depending on how the serial number of the ONT is acquired, there are two different ranging methods available in the G.983.1 recommendation, called Method-A and Method-B. In Method-A, the serial number is registered (e.g., manually) at the OLT by the Operation Systems, while Method-B resorts to an automatic detection mechanism of the serial number based on a binary tree search algorithm. Third, the OSU transmits downstream three Assign_PON_ID messages that link a PON_ID (a logical address) with the serial number of the ONT. Fourth, the OSU transmits downstream three Grant_allocation messages that assign the PLOAM and DATA grant values to the ONT. Up to this point, all downstream PLOAM cells had only unassigned grants. Consequently, there would have been no upstream transmission. At this point, however, the downstream PLOAM cells will contain either ranging grants or PLOAM grants for the ONTs, causing them to transmit upstream cells. At this point, actual delay measurement can be done as follows.

First, the OSU measures the round-trip transmission delay Td between the OSU and an ONT. Second, the OSU calculates the value of an additional delay Teq=Tid−Td, where Tid is the common logical delay to which all ONTs are to be set. Third, the OSU informs the ONT of the calculated additional delay Teq, which the ONT then adds as a fixed offset to its time of transmission.

Once this is done for all ONTs, the ONTs are said to be ranged. From this point on, all upstream cells transmitted by the different ONTs at different time slots will arrive in different 56-byte time slots at the OSU with no overlap.

Ranging also enables the correct placement of the reset pulses for the burst mode receiver in the OSU. As explained above, the received power of the optical signals at the OSU is different for each ONT. Consequently, a reset pulse is applied to the BMR at the beginning of each upstream cell to cause the BMR to dynamically adjust its trigger level. This reset pulse should be placed in a guard band that occurs at the beginning of the 3-byte overhead that is transmitted at the beginning of each 56-byte upstream cell. Ranging can be seen as a process of ensuring that the arrival times of the upstream cells are such as to ensure that a BMR reset pulse coincides with the guard band in the 3-byte overhead of each upstream cell.

FIGS. 3A–H show timing diagrams that illustrate the relationship between the values of Teq, Tid, and Td as well as provide a simple explanation of the ranging process carried out in ATM-PON systems that conform to the G.983.1 recommendation.

Figure 3A:
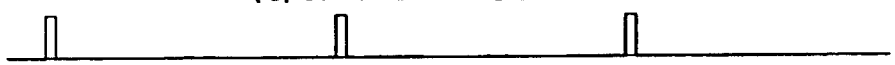
FIGS. 3A–H show timing diagrams that illustrate the relationship between the values of Teq, Tid, and Td as well as provide a simple explanation of the ranging process carried out in ATM-PON systems that conform to the ITU-T Recommendation G.983.1.
Figure 3B:
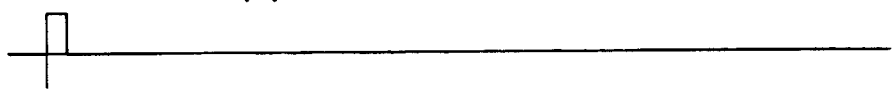

In particular, FIG. 3A shows the location of the boundaries for consecutive downstream frames. FIG. 3B shows a downstream Ranging PLOAM cell for the case where the ranging grant is located in the first grant field in the first PLOAM cell of the downstream frame.

Figure 3C:

FIG. 3C shows an upstream Ranging Reply PLOAM cell (i.e., another special type of PLOAM cell) that would be generated by the appropriate ONT in response to the received downstream Ranging PLOAM cell for the hypothetical case where the round-trip transmission delay Td is zero. The duration Tmin shown in FIG. 3C corresponds to the total processing and queuing time that it takes for the ONT to process a received downstream Ranging PLOAM cell and generate a corresponding Ranging Reply PLOAM cell for transmission back to the OSU, not counting any actual downstream or upstream transmission time.

Figure 3D:
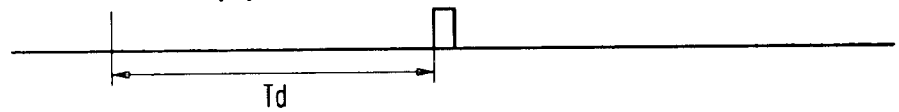

FIG. 3D shows an upstream Ranging Reply PLOAM cell generated by the ONT for a realistic situation in which the round-trip transmission delay Td is greater than zero. The OSU measures the total round-trip duration between transmitting the downstream Ranging PLOAM cell and receiving the upstream Ranging Reply PLOAM cell and derives the round-trip delay Td for the ONT by comparing the total round-trip duration with the a priori value for Tmin. The OSU then calculates and transmits the additional delay Teq for the particular ONT in a RANGING_TIME message. After this procedure is performed for each ONT, the ONTs are said to be ranged.

Figure 3E:
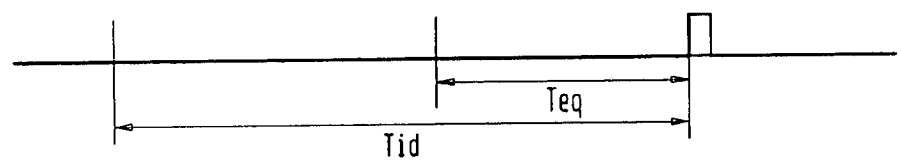

FIG. 3E shows the timing of an upstream cell generated by the ONT after ranging is complete. As shown in FIG. 3E, after the ONT has been ranged, the additional delay Teq is added by the ONT as a fixed offset to its time of transmitting the upstream cell to ensure that the transmission of the upstream cell occurs after the common logical delay Tid.

Figure 3F:
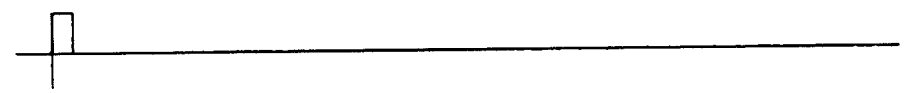
Figure 3G:
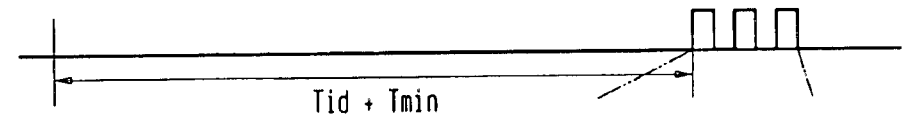
Figure 3H:
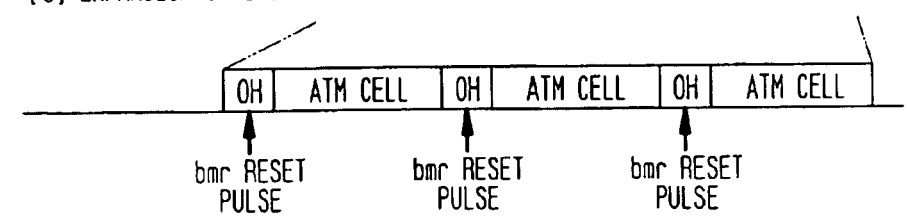

FIGS. 3F–H show typical operations after the ONTs are ranged. In particular, FIG. 3F shows a downstream PLOAM cell with grants for particular ONTs for the first, second, and third time slots, and FIG. 3G shows the three upstream cells that are generated by the particular ONTs in response to the PLOAM cell of FIG. 3F. Note that, no matter which set of ONTs generate those three cells, they will be properly timed relative to the same total logical delay (i.e., Tid+Tmin).

FIG. 3H shows an expanded view of the three upstream cells of FIG. 3G, where each upstream cell consists of a 3-byte overhead (OH) followed by a conventional 53-byte ATM cell. FIG. 3H also shows how a BMR reset pulse is timed to occur within the overhead of each upstream cell.

Protection Topologies

Figure 4:
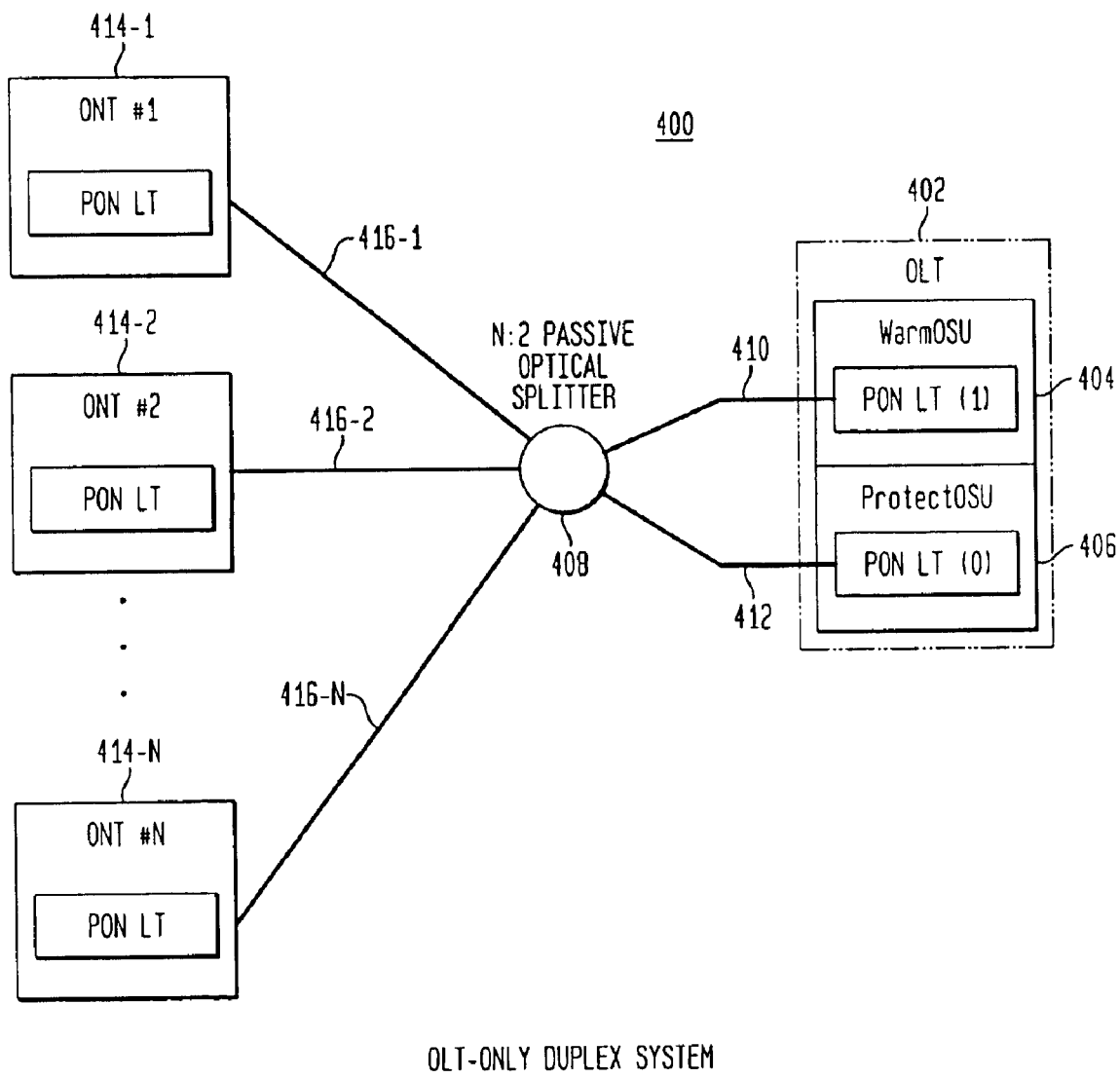
FIGS. 4 and 5 show protection topologies corresponding to Options B and D, respectively, from Appendix D of the ITU-T Recommendation G.983.1.
Figure 5:
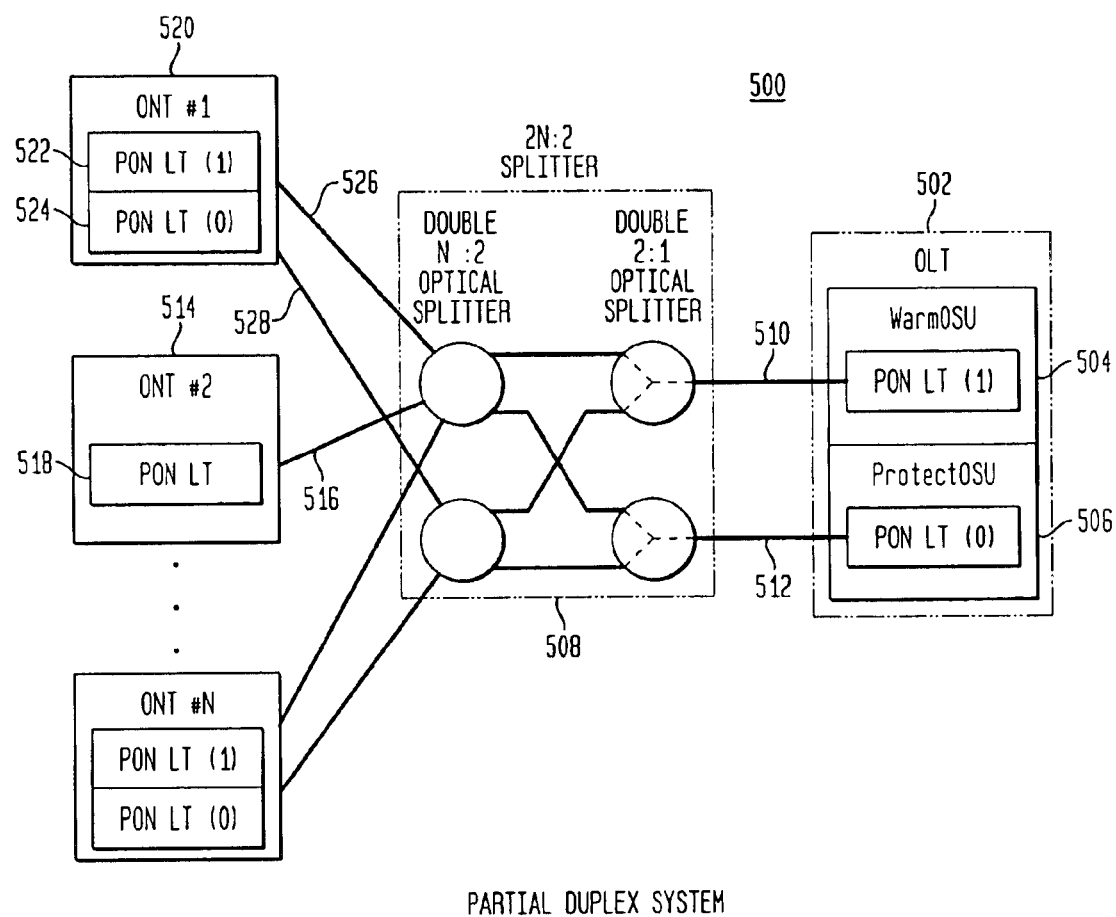

The G.983.1 recommendation defines certain specific protection topologies. Two of those topologies—Options B and D from Appendix D of the G.983.1 recommendation— are shown in FIGS. 4 and 5. In option B, only the path between the OSU and the splitter is protected. In option D, the total path between the OSU and at least one of the ONTs is protected. Thus, in Option D, the path between the OSU and the splitter is protected, the splitter itself is protected, and the paths between the splitter and one or more of the ONTs are also protected.

In particular, FIG. 4 shows a passive optical network 400 comprising optical line termination (OLT) 402 having two OSUs 404 and 406, where each OSU is connected to splitter 408 by a different optical fiber 410 and 412, respectively, where fibers 410 and 412 may be physically separated from one another to improve network survivability. Splitter 408 is also connected to N ONTs 414 by N unprotected optical fibers 416. For this protection topology, splitter 408 is implemented using a single N:2 passive optical splitter that passively combines the N different upstream signals received from the N ONTs 414 over the N optical fibers 416 into two identical copies of an upstream TDMA signal transmitted in parallel to OSUs 404 and 406 over optical fibers 410 and 412, respectively. In addition, splitter 408 passively combines the optical signals received from the two OSUs 404 and 406 over optical fibers 410 and 412, respectively, and broadcasts N identical copies of the resulting combined downstream cell stream to the N ONTs 414 over the N optical fibers 416, respectively.

In operation, one of the two OSUs is selected as the working OSU (e.g., WarmOSU 404 in FIG. 4), while the other OSU is designated as the protection OSU (e.g., ProtectOSU 406). In the situation shown in FIG. 4, optical fiber 410 is the working fiber and optical fiber 412 is the protection fiber. OLT 402 has a controller (not shown in FIG. 4) that, among other things, (1) monitors network performance to perform system and component health checks and to detect when a fault occurs and (2) controls the selection of the working and protection OSUs to implement protection switching when appropriate.

During normal operations, both the working OSU and the protection OSU are powered on with both OSUs receiving their respective copies of the upstream TDMA signal, but only the working OSU actively transmits optical signals downstream. As such, at any given time, splitter 408 will receive active optical signals from only one of the OSUs (i.e., the working OSU). In this way, splitter 408 can be implemented as a passive device for both upstream and downstream signal processing.

Similar to FIG. 4, FIG. 5 shows a passive optical network 500 comprising OLT 502 having two OSUs 504 and 506 connected to a splitter 508 by different (possibly physically separated) optical fibers 510 and 512, respectively. Like splitter 408 in FIG. 4, splitter 508 is also connected to N ONTs, but, in network 500, some of the ONTs (e.g., ONT 520) have two line termination (LT) units (e.g., 522 and 524) connected to splitter 508 by different (possibly physically separated) optical fibers (e.g., 526 and 528, respectively), while other ONTs (e.g., 514) have a single LT unit (e.g., 518) that is connected to splitter 508 by a single, unprotected optical fiber (e.g., 516).

For this protection topology, splitter 508 is implemented using an 2N:2 passive optical splitter, comprising two N:2 passive optical splitters configured with two 2:1 passive optical splitters, where 2N:2 splitter 508 passively combines the up to 2N different upstream signals received from the N ONTs over the up to 2N optical fibers into two identical copies of an upstream TDMA signal transmitted in parallel to OSUs 504 and 506 over optical fibers 510 and 512, respectively. In addition, splitter 508 passively combines the optical signals received from the two OSUs 504 and 506 over optical fibers 510 and 512, respectively, and broadcasts the combined downstream cell stream to the N ONTs over the up to 2N optical fibers.

similar to PON 400 of FIG. 4, when PON 500 is in operation, one of the two OSUs is selected as the working OSU (e.g., WarmOSU 504), while the other OSU is designated as the protection OSU (e.g., ProtectOSU 506). In the situation shown in FIG. 5, optical fiber 510 is the working fiber and optical fiber 512 is the protection fiber. As in OLT 402, OLT 502 has a controller (not shown in FIG. 5) that, among other things, (1) monitors network performance to perform system and component health checks and to detect when a fault occurs and (2) controls the selection of the working and protection OSUs to implement protection switching when appropriate.

As in network 400 of FIG. 4, during normal operations of network 500, both the working OSU and the protection OSU are powered on with both OSUs receiving their respective copies of the upstream TDMA signal, but only the working OSU actively transmits optical signals downstream. As such, at any given time, splitter 508 will receive active optical signals from only one of the OSUs (i.e., the working OSU). In this way, splitter 508 can be implemented as a passive device for both upstream and downstream signal processing.

In addition, in analogous fashion, within each protected ONT (e.g., 520), one of the two LT units is selected as the working LT unit (e.g., PON LT(1) 522 in FIG. 5), while the other LT unit is designated as the protection LT unit (e.g., PON LT(0) 524). In the situation shown in FIG. 5, optical fiber 526 is the working fiber and optical fiber 528 is the protection fiber. As in OLT 502, each protected ONT 520 has a controller (not shown in FIG. 5) that, among other things and depending on the implementation, may (1) monitor network performance to perform LT unit health checks and to detect when a fault occurs and (2) control the selection of the working and protection LT units to implement protection switching when appropriate. During normal operations, both the working LT unit and the protection LT unit are powered on with both OSUs receiving their respective copies of the downstream cell stream, but only the working LT unit transmits upstream. As such, only one of the two upstream optical signals received by splitter 508 from each protected ONT will contain any upstream cells (i.e., generated by the working LT unit); the other upstream optical signal will be off (i.e., corresponding to the protection LT unit).

Of course, for each unprotected ONT (e.g., 514), the corresponding LT unit 518 is always powered on and capable of transmitting upstream cells to splitter 508 over its corresponding unprotected optical fiber 516, which can be arbitrarily configured to either of the two N:2 optical splitters within splitter 508.

On-Line Health Check Algorithm for the Protection OSU

According to embodiments of the present invention, the functionality of the protection circuit, which includes the protection BMR in the protection OSU as well as the optical fiber between the splitter and the protection OSU, is continuously checked during normal operation by implementing an on-line health check algorithm in order to ensure that the protection circuit will work if and when it is needed in the event of a failure of the working circuit. The on-line health check algorithm for the protection OSU is based on (1) an optical power meter with a splitter for detecting a fiber cut and (2) a cell delineation procedure for detecting a BMR failure. As such, the on-line health check algorithm can detect a failure of the protection OSU and identify the failed component (e.g., the BMR or the fiber). The on-line health check algorithm assumes the following conditions:

The working OSU is in its normal operation with all ONTs ranged, where the working OSU is sending grants downstream and receiving corresponding cells upstream; and The protection OSU is receiving upstream signals from the ONTs via the passive optical splitter.

Detecting a Protection Fiber Cut

In order to detect a cut fiber to the protection OSU, a splitter is placed just prior to the BMR in the protection OSU with one copy of the received upstream signal provided to the BMR and the other copy provided to an optical power meter, which measures the optical power on the fiber to determine whether or not the fiber is cut. For example, the power in optical signals can be measured for bursts of 448 bits (i.e., 56 bytes). If a fiber is cut, then the power meter should not receive much optical signal (assuming that another light source does not inject spurious light into the cut end of the fiber).

Detecting a Failed Protection BMR

In order for a BMR to operate properly, it is important that the BMR be reset during the guard band so that the BMR can accurately adjust its trigger level using the corresponding bit pattern that follows the guard band in the 3-byte overhead. For example, proper ranging of ONTs for the working OSU enables the OSU controller to apply reset pulses to the BMR that coincide with the guard band of each 56-byte upstream cell. However, because the optical fiber between the working OSU and the splitter may be physically separated from the optical fiber between the protection OSU and the splitter, there is no guarantee that the values for the additional delays Teq used to range the ONTs for the working OSU will be the same as the values for ranging the ONTs for the protection OSU.

Since the ONTs will not necessarily be ranged for the protection OSU, monitoring data output from the BMR in the protection OSU and looking for activity are not enough to detect a BMR failure, because system noise or a malfunctioning BMR can generate a random bit stream that looks like that of a functional protection BMR receiving real data from unranged ONTs. Depending on the initial setting of the protection BMR's trigger level, even a normal functioning BMR receiving real data from unranged ONTs can generate long strings of 0s or 1s, because the BMR trigger level will not be properly adjusted at the start of each upstream cell.

According to embodiments of the present invention, a cell delineation procedure is performed to locate the beginning of upstream cells in the optical signal received at the BMR of the protection OSU. As described earlier, upstream user data cells transmitted by the ONTs consist of a 3-byte overhead followed by a conventional 53-byte ATM cell. The 3 bytes of the overhead are further divided into a guard band, followed by a bit pattern for BMR trigger-level adjustment, followed by a bit pattern for synchronization.

Although the ranging procedure determines a value for the additional delay Teq between each ONT and the working OSU, there may still be some inaccuracy in the relative timing of the different upstream cells as they arrive at the OSU. For this reason, a guard band (e.g., consisting of all 0s) is placed at beginning of the 3-byte overhead. The exact numbers of bits in the 3-byte overhead allocated for the guard band and the two bit patterns depend on the accuracy of the ranging procedure and the particular characteristics of the BMR, but a typical guard band will be about 10 bits long.

Following the 3-byte overhead in each 56-byte upstream user data cell (i.e., non-PLOAM cells) is a conventional 53-byte ATM cell consisting of a 5-byte ATM header followed by 48 bytes of user data. The fifth byte of the 5-byte ATM header is a header error correction (HEC) byte corresponding to the first four bytes in the ATM header. The cell delineation procedure takes advantage of the existence of these HEC bytes in the ATM cells to locate the upstream cell boundaries in the upstream TDMA signal received at the BMR of the unranged protection OSU.

Figure 6:
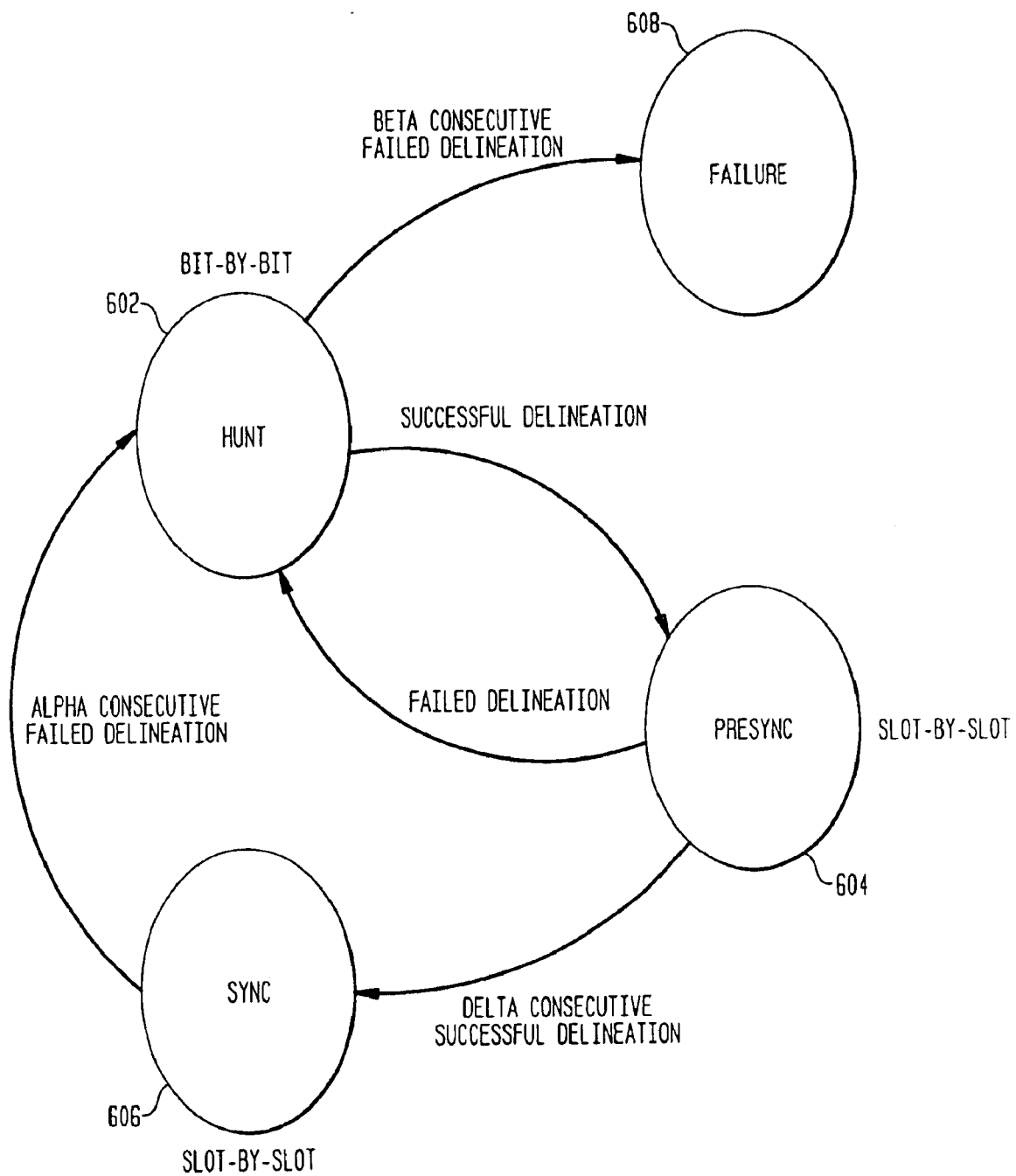
FIG. 6 shows a state diagram of a cell delineation procedure, according to certain embodiments of the present invention.

FIG. 6 shows a state diagram of the cell delineation procedure, according to certain embodiments of the present invention. The state diagram of FIG. 6 has four different states: HUNT 602, PRESYNC 602, SYNC 606, and FAILURE 608.

In the HUNT state, the cell delineation process is performed by shifting the position of the reset pulse to the BMR of the protection OSU bit by bit to look for the HEC byte of an upstream cell. If the BMR is working properly with real received data, by shifting the position of the BMR reset pulse bit by bit, eventually the reset pulse will coincide with the guard band of an upstream cell. In that case, the BMR's trigger level will be correctly adjusted using the corresponding bit pattern in the overhead and the correct set of bits will be identified as the ATM HEC byte, which will correctly correspond to the previous four ATM header bytes. As soon as the HUNT state finds a correct ATM HEC byte, a state transition to the PRESYNC state occurs. On the other hand, if the HUNT state fails to find a correct ATM HEC byte after BETA consecutive failed delineation attempts, a state transition to the FAILURE state occurs, indicating that the BMR in the protection OSU has failed (assuming that a fiber cut has not already been detected by the optical power meter).

In the PRESYNC state, the cell delineation procedure is repeated using the relative position of the BMR reset pulse identified during the HUNT state for each subsequent upstream cell. If the cell delineation procedure fails (i.e., if the ATM HEC byte is not correct), then a state transition back to the HUNT state occurs. On the other hand, if the cell delineation procedure succeeds for DELTA consecutive upstream cells, then a state transition to the SYNC state occurs.

As in the PRESYNC state, in the SYNC state, the cell delineation procedure is repeated using the relative position of the BMR reset pulse identified during the HUNT state for each subsequent upstream cell. If the cell delineation procedure fails for ALPHA consecutive upstream cells, then a state transition back to the HUNT state occurs.

In general, if there are no problems with the fiber and the BMR of the protection OSU, then the cell delineation procedure of FIG. 6 will correctly identify the cell boundaries, reaching and staying mostly at the SYNC state, except for short and transient stays at the HUNT and PRESYNC states that may result from random bit errors and fluctuations in incoming cell boundaries. On the other hand, if there is a problem with the protection OSU, then the cell delineation procedure will fail long enough to move the process to the FAILURE state and declare that a failure of the BMR of the protection OSU has been detected.

The values of parameters ALPHA, BETA, and DELTA may be empirically chosen to make the cell delineation process as robust and secure as possible for the particular implementation. Robustness against false indication of misalignments due to bit errors in the channel depends on the value of ALPHA, while robustness against false delineation in the resynchronization process depends on the value of DELTA.

Figure 7A:
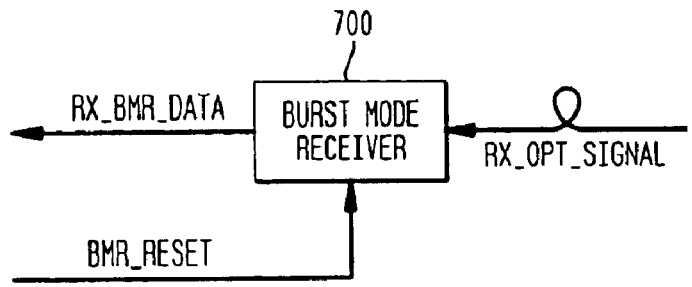
FIGS. 7A–E shows a simple example of the cell delineation procedure corresponding to a state transition from the HUNT state to the PRESYNC state of FIG. 6.
Figure 7B:
Figure 7C:
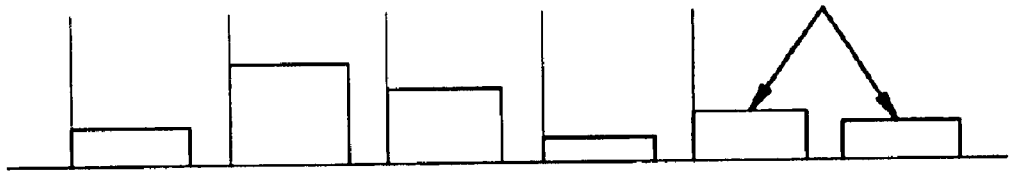

FIGS. 7A–E show a simple example of the cell delineation procedure corresponding to a state transition from the HUNT state to the PRESYNC state of FIG. 6. In particular, FIG. 7A shows BMR GA of the protection OSU (i) receiving a continuous upstream optical signal RX_OPT_SIGNAL and discrete BMR reset pulses BMR_RESET and (ii) generating a corresponding decoded data stream RX_BMR_DATA. FIG. 7B shows the timing reference at the working OSU, where each vertical line corresponds to the start of another upstream cell in RX_OPT_SIGNAL, as shown in FIG. 7C. As indicated in FIG. 7C, each upstream cell may have a different optical signal power level.

Figure 7D:
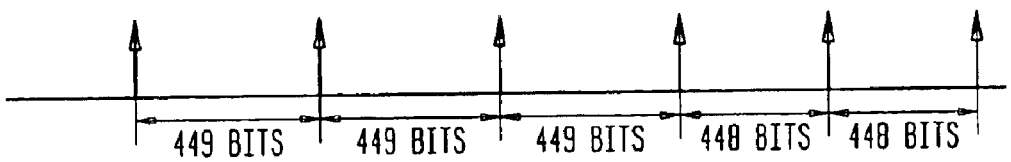
Figure 7E:
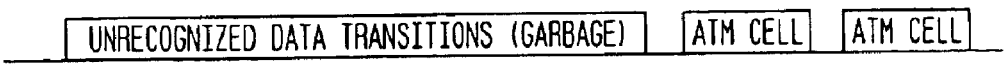

FIG. 7D shows the timing of the BMR_RESET pulses during the cell delineation procedure of FIG. 6. The first four pulses (from left to right in FIG. 7D) occur with the cell delineation procedure in the HUNT state. As described above, during the HUNT state, the BMR_RESET pulses are shifted bit by bit until a correct HEC byte is found. In the example of FIG. 7D, this bit shifting is represented by BMR_RESET pulses that are separated by 449 bits (i.e., 1 bit more than a 56-byte time slot). For the first three BMR_RESET pulses in FIG. 7D, the pulses do not coincide with the guard band of an upstream cell in FIG. 7C. As such, the trigger level of BMR GA will likely not be appropriately adjusted and the RX_BMR_DATA generated by the BMR will likely be unrecognized data transitions (i.e., garbage), in which case the ATM HEC byte will not be found.

The fourth BMR_RESET pulse in FIG. 7D however coincides with the guard band of the fifth upstream cell shown in FIG. 7C. As such, the trigger level of BMR GA is accurately adjusted, the ATM cell is accurately decoded (as indicated by the second to last ATM cell in FIG. 7E), the ATM HEC byte is found, and a state transition from the HUNT state to the PRESYNC state in FIG. 6 occurs. The timing of the last two BMR_RESET pulses shown in FIG. 7D is based on the timing of the fourth BMR_RESET pulse when the transition from the HUNT state occurred (i.e., 56 bytes apart) and will coincide with the guard bands of the last two upstream cells shown in FIG. 7C, resulting in accurately decoded ATM cells in RX_BMR_DATA, as indicated by the last ATM cell in FIG. 7E.

Because there is no continuous bit stream available in the upstream direction at the OSU, the BMR should achieve bit synchronization during the portion of the overhead at the start of every upstream cell that follows the guard band. During normal operations, once the ONTs have been ranged, cell delineation can also be achieved by searching for a unique pattern (i.e., a delimiter) in the overhead after recovering bit synchronization. The cell delineation procedure may be made even more insensitive to random bit errors, by checking for such a delimiter in addition to the ATM HEC byte.

Figure 8A:
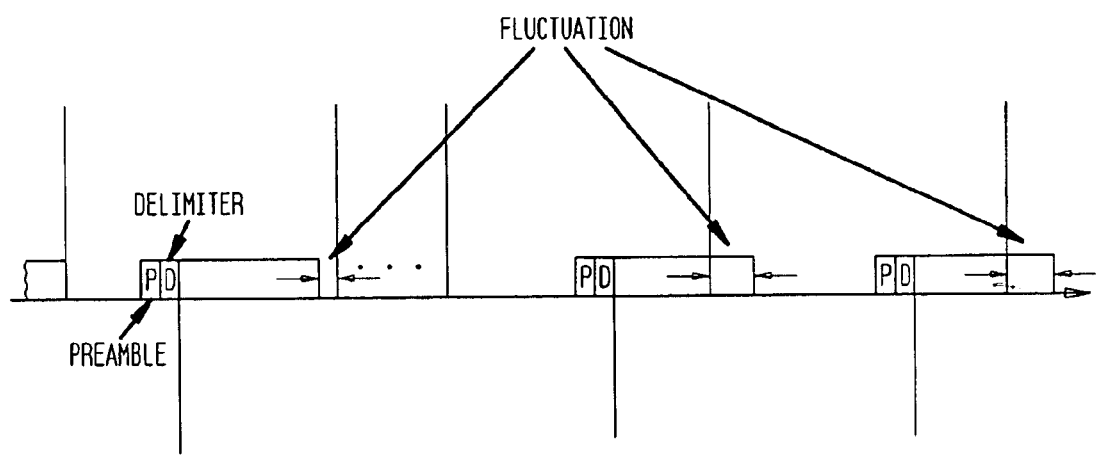
FIGS. 8A–B show time lines representing possible results when using a window that is too small during the cell delineation procedure of FIG. 6.
Figure 8B:
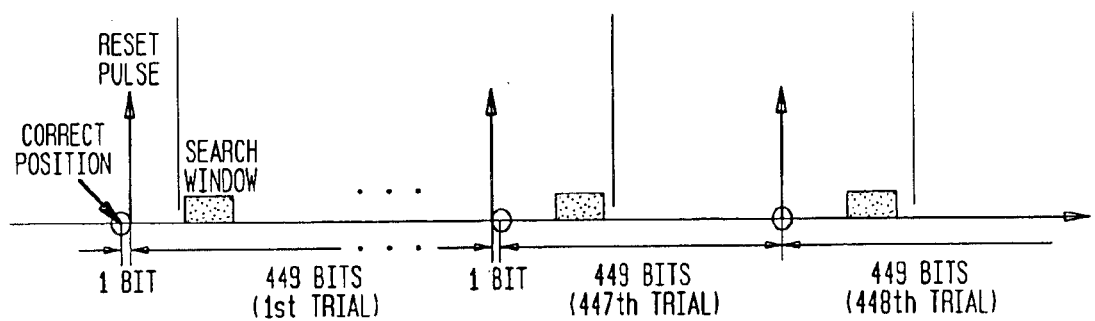

There may be several BMR reset pulse positions that would result in correct cell delineation. Because of inaccuracy in the ranging procedure (usually on the order of one bit), there is always some fluctuation in upstream cell boundaries from different ONTs. To cover this fluctuation, the process of searching for the delimiter should be performed for a range of bits (i.e., a window) centered on the assumed correct position. If the size of this window is not large enough to cover the fluctuation in cell boundaries resulting from ranging inaccuracy, correct cell delineation might not be achieved after checking all 448 positions bit by bit, even without bit errors, which may lead to the false conclusion that a BMR fault has been detected. FIGS. 8A–B show time lines representing possible results when using a window that is too small during the cell delineation procedure.

Figure 9A:
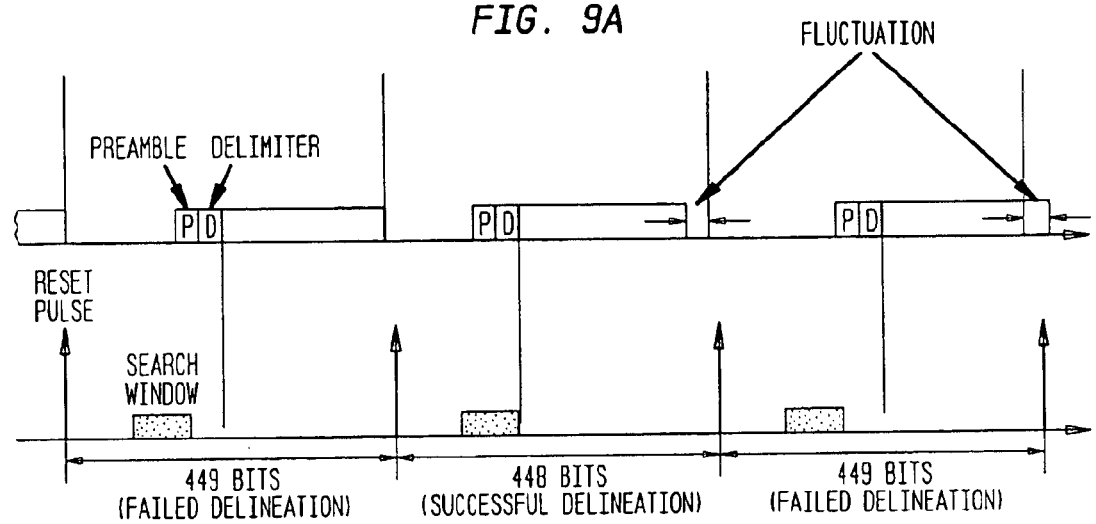
FIGS. 9A–B show time lines representing possible results when using a window that is too large during the cell delineation procedure of FIG. 6.
Figure 9B:
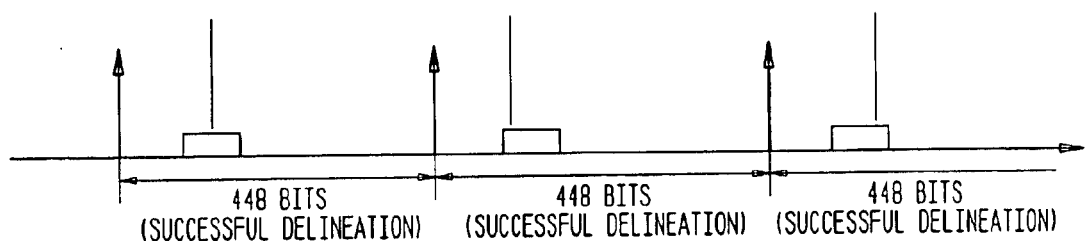

On the other hand, if the search window is too large, the cell delineation procedure may transition to the PRESYNC state with an incorrect reset pulse position. FIGS. 9A–B show time lines representing possible results when using a window that is too large during the cell delineation procedure. FIG. 9A shows a situation where the cell delineation procedure transitions to the PRESYNG state with an incorrect reset pulse position and immediately transitions back to the HUNT state, while FIG. 9B shows a situation where the cell delineation procedure transitions to the PRESYNG state with the correct reset pulse position. Except for a slight increase in time to enter the SYNC state, when proper values are used for ALPHA and DELTA, the cell delineation procedure of FIG. 6 guarantees eventually finding a correct reset pulse position, even after several state transitions between the HUNT and PRESYNC states.

When the cell delineation procedure of FIG. 6 is in the SYNC state, it is known that the BMR in the protection OSU is functioning properly and the fiber is uncut. If, however, the procedure enters the FAILURE state, the failed component(s) can be identified by the following reasoning based on available information:

Case 1: If (i) the BMR in the working OSU is decoding upstream cells, (ii) the BMR in the protection OSU reaches the FAILURE state, and (iii) the power meter in the protection OSU measures no power from the fiber to the protection OSU, then the fiber from the splitter to the protection OSU is cut.

Case 2: If (i) the BMR in the working OSU is decoding upstream cells, (ii) the BMR in the protection OSU reaches the FAILURE state, and (iii) the power meter in the protection OSU measures sufficient power from the fiber to the protection OSU, then the BMR in the protection OSU has failed.

Case 3: If the BMRs in both the working and protection OSUs are not decoding upstream cells from any of the ONTs, there could be a failure in the downstream transmissions generated by the working OSU (resulting in no grants arriving at the ONTs) or a failure in the optical splitter.

Case 4: If the BMRs in both the working and protection OSUs are not decoding upstream cells from the same specific ONT, there could be a failure at that ONT's transmitter or the fiber from that ONT to the splitter could be cut.

For Cases 1 and 2, the failure will typically be detected before the protection OSU needs to be used, which is the purpose of performing the health check of the protection circuit in the first place. In these situations, an operator could intervene to confirm and fix the failure.

Fast Protection Ranging by Snooping During the Working OSU's Ranging Process

Protection switching shifts all data transmitted and received from the failed working OSU to the protection OSU, in which case the protection OSU needs to range the ONTs to measure the Td value and recalculate the correct additional delay Teq value for each ONT. Since ranging of all ONTs can take a relatively long time, this is the critical step in protection switching with respect to time constraints. According to the SONET specification, protection switching should be completed within 50 ms. To address this constraint, embodiments of the present invention implement a fast ranging algorithm based on snooping by the protection OSU during the original ranging procedure performed by the working OSU in order to measure the differences in the Td values for the various ONTs that result from differences in the fiber lengths between the splitter and the working OSU and between the splitter and the protection OSU.

In particular, when the working OSU performs its ranging procedure, the protection OSU monitors the upstream cell stream. This is possible since the splitter sends upstream signals to both the working and protection OSUs. Referring to FIG. 4, for example, when the working OSU performs ranging for ONT #1, a downstream ranging PLOAM cell is transmitted from working OSU 404 along fiber 410 to splitter 408 and then along fiber 416-1 to ONT #1, and a corresponding upstream ranging reply PLOAM cell is then transmitted from ONT #1 back along fiber 416-1 to splitter 408 and then back along fiber 410 to working OSU 404. To range ONT #1, the working OSU determines a total round-trip propagation delay Td1 for this round-trip "ranging" propagation path and uses that value to determine the additional delay Teq for ONT #1.

If the working OSU informs the protection OSU when the downstream ranging PLOAM cell is transmitted to ONT #1, then, by monitoring the upstream cell stream, the protection OSU can measure a ranging delay value Td2 corresponding to the duration of propagation of the downstream ranging PLOAM cell from the working OSU to the ONT plus the duration of propagation of the corresponding upstream ranging reply PLOAM cell from the ONT to the protection OSU. As shown in FIG. 4, the only difference between the round-trip "ranging" propagation path between the working OSU and ONT #1 and the "snooping" propagation path from the working OSU to ONT #1 and back to the protection OSU is the last link from the splitter to either the working or protection OSU. As such, the ranging delay difference D2=(Td1−Td2) can be used by the OLT controller to characterize the difference in fiber lengths between the splitter and the working OSU and between the splitter and the protection OSU.

Since the only difference in these ranging and snooping propagation paths is the last link, which is the same for all ONTs, in theory, the ranging delay difference D2 should be identical for all of the ONTs. In reality, however, the value determined for the ranging delay difference D2 may vary slightly when ranging different ONTs. The OLT controller (or, depending on the implementation, the protection OSU) preferably determines an average D2 value based on the different D2 values generated during ranging of the various ONTs.

When ranging is completed for all ONTs, the OLT controller (or the working OSU) will have determined a particular additional delay value Teq for each different ONT. The OLT controller (or the protection OSU) can then use the average D2 value to determine a "protection" Teq value for each ONT. These protection Teq values are stored (in either the OLT controller or within the protection OSU) and, when a protection switch occurs from a failed working OSU to the backup protection OSU, the protection OSU transmits the stored protection Teq values to the corresponding ONTs to effectively achieve fast ranging of the ONTs without having to go through the entire time-consuming ranging procedure.

In general, this fast ranging algorithm involves different operations at different phases of network processing. In the following, it is assumed that both working and protection OSUs can be synchronized. In other words, it is assumed that delay for a signal from the working OSU to the protection OSU (see Step 1) is negligible, which is the case when two OSUs are housed in the same OLT. At startup, the operations are as follows:

Step 1: For each ONT, the working OSU informs the protection OSU that a downstream ranging PLOAM cell is transmitted from the working OSU.

Step 2: The working and protection OSUs monitor their respective upstream cell streams for the corresponding upstream ranging reply PLOAM cell from the ONT and both OSUs measure their respective Td values for the ONT (i.e., Td1 for the working OSU and Td2 for the protection OSU).

Step 3: The working OSU informs the protection OSU of its measured Td1 value.

Step 4: The protection OSU calculates/updates D2 based on the difference between Td1 and Td2, and keeps it in memory.

Steps 1–4 are repeated whenever the working OSU performs ranging for an ONT to verify/update the value of D2 retained by the protection OSU, including, during normal operations, if and when a new ONT is configured in the system.

After ranging an ONT, the working OSU calculates an appropriate value for the additional delay Teq for that ONT based upon the measured Td1 value. In addition to transmitting this working Teq value to the ONT, the working OSU informs the protection OSU of the working Teq value for that ONT. The protection OSU can then calculate a protection Teq value for that ONT based on the following equation:

$$Teq\_prot = Teq\_work - (1+\alpha)*(Td2 - Td1),$$

where $\alpha$ is the ratio of the upstream propagation speed to the downstream propagation speed and the $(1+\alpha)$ factor takes into account the differences between upstream and downstream propagation delays when different wavelengths are used for upstream and downstream transmissions (e.g., as in a network that used bi-directional fibers with wavelength division multiplexing (WDM)).

If and when protection switching occurs, upon becoming the new working OSU, the protection OSU sends its stored set of protection Teq values to the ONTs, and begins normal operations.

When the synchronization between two OSUs is not perfect (i.e., very coarse) in certain implementations, the protection OSU would have to perform some manner of ranging again after protection switching occurs. Even in this case, however, because the protection OSU would have approximate Teq values, much faster ranging is possible. For example, parallel ranging could be performed, where the ranging reply PLOAM cells for multiple ONTs are measured in a single ranging window.

If timestamps are collected for all upstream PLOAM cells or data cells, the working and protection Td differences can be continuously monitored to make sure that the D2 values used by the protection OSU is accurate. This can be implemented in a "lazy" fashion. Since the value of Td2 is known, the correct timing for reset pulses is also known. Consequently, all upstream cells may be accurately processed by the protection OSU. In that case, the working OSU would inform the protection OSU that it would send out a certain PLOAM grant at a particular time, and both OSUs could measure their times of reception.

Fast Protection Ranging by Snooping on PLOAM Cells

The fast ranging procedure described in the previous section relies on the protection OSU snooping during the normal ranging procedure performed by the working OSU. In so-called "hot plug-in" situations, however, a protection OSU is configured into an operational network after the working OSU has already ranged the ONTs. This section describes a technique for enabling fast ranging in the event of a protection switch from a failed working OSU to a protection OSU, where the technique relies on the protection OSU snooping on PLOAM cells transmitted during normal operations (i.e., after the ONTs have been ranged by the working OSU, but prior to failure of the working OSU). As such, the present technique is applicable in hot plug-in situations.

The present technique relies on the measurement of the arrival times of corresponding upstream cells at both the working and protection OSUs. Although any specific cell could be used, PLOAM cells are relatively easy to identify unambiguously.

FIGS. 10A–E show representations of time lines associated with the present technique. In particular, FIG. 10A shows the frame boundaries for the downstream channel, where each start of frame (SOF) is assumed to be synchronized between the working and protection OSUs for simplicity of description (which can be easily done when both OSUs are housed in the same OLT). FIG. 10B shows a sequence of four downstream PLOAM cells (P1, P2, P3, and P4) transmitted by the working OSU, where PLOAM cell P1 is assumed to contain a PLOAM grant for only ONT #1. Assuming that every ONT is eventually given a PLOAM grant, at least one upstream reply PLOAM cell will be generated by ONT #1 over some reasonable period of time.

FIG. 10C shows the timing of the arrival of the corresponding upstream reply PLOAM cell transmitted by ONT #1 in response to the PLOAM grant in PLOAM cell P1 at both the working and protection OSUs for the hypothetical situation where the round-trip transmission durations Td1 and Td2 are both zero. FIG. 10D shows the timing of the arrival of the upstream reply PLOAM cell transmitted by ONT #1 at the working OSU for the real situation where Td1>0, and FIG. 10E shows the timing of the arrival of the upstream reply PLOAM cell transmitted by ONT #1 at the protection OSU for the real situation where Td2>0. As shown in FIG. 10E, the difference between Td1 and Td2 is the ranging delay difference D2.

The present technique assumes that, even before the protection OSU determines a correct value for D2, it is able to accurately detect the arrival of the upstream reply PLOAM cell. But this assumes that the reset pulse for the BMR in the protection OSU is applied at the correct time to accurately adjust the BMR trigger level for each different upstream cell. This can be achieved using the cell delineation procedure of FIG. 6 described earlier in this specification.

In general, the present technique can be implemented by the following four steps:

Step 1: After the protection OSU has been configured onto the network, the cell delineation procedure of FIG. 6 is initiated for the protection OSU.

Step 2: When correctly delineated cells are received at the protection OSU (i.e., when the cell delineation procedure of FIG. 6 reaches the SYNC state), the arrival times of upstream reply PLOAM cells at the protection OSU are compared to the arrival times of the corresponding upstream reply PLOAM cells at the working OSU to generate a value for the ranging delay difference D2.

Step 3: The calculated D2 value is stored (for use in performing fast ranging if and when a protection switch from the working OSU to the protection OSU occurs).

Depending on the particular implementation, control and implementation of these various functions are appropriately distributed between the OLT controller and the working and protection OSUs.

1:N Protection Switching

The previous sections described different types of processing performed in the context of a 1:1 protection switching architecture in which there is a dedicated protection circuit for each protected working circuit. The techniques described in the previous sections can also be implemented in the context of 1:N protection switching architectures in which a single protection circuit provides backup for a plurality (i.e., N) working circuits. Such architectures are advantageous when the probability that two or more working circuits will fail at the same time is very low.

Figure 11:
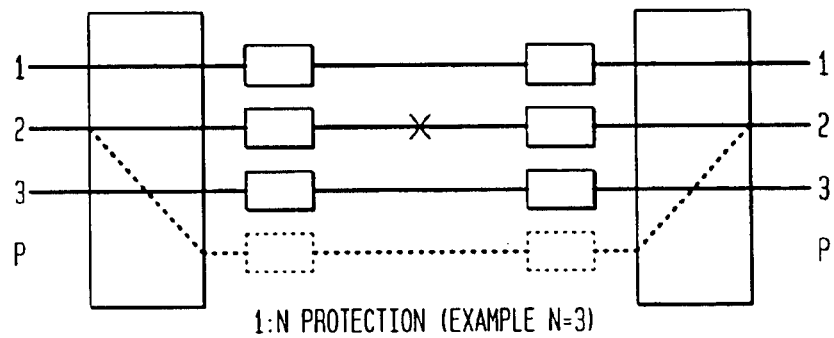
FIG. 11 shows a block diagram of a 1:N protection switching architecture where N=3.

FIG. 11 shows a block diagram of a 1:N protection switching architecture where N=3. In this architecture, a single protection circuit P provides backup for three different working circuits 1, 2, and 3. In the event of failure of any one of the working circuits (e.g., a fiber cut in circuit 2 as indicated by the "X" in FIG. 11), protection switching is implemented to replace the failed working circuit with protection circuit P.

Figure 12:
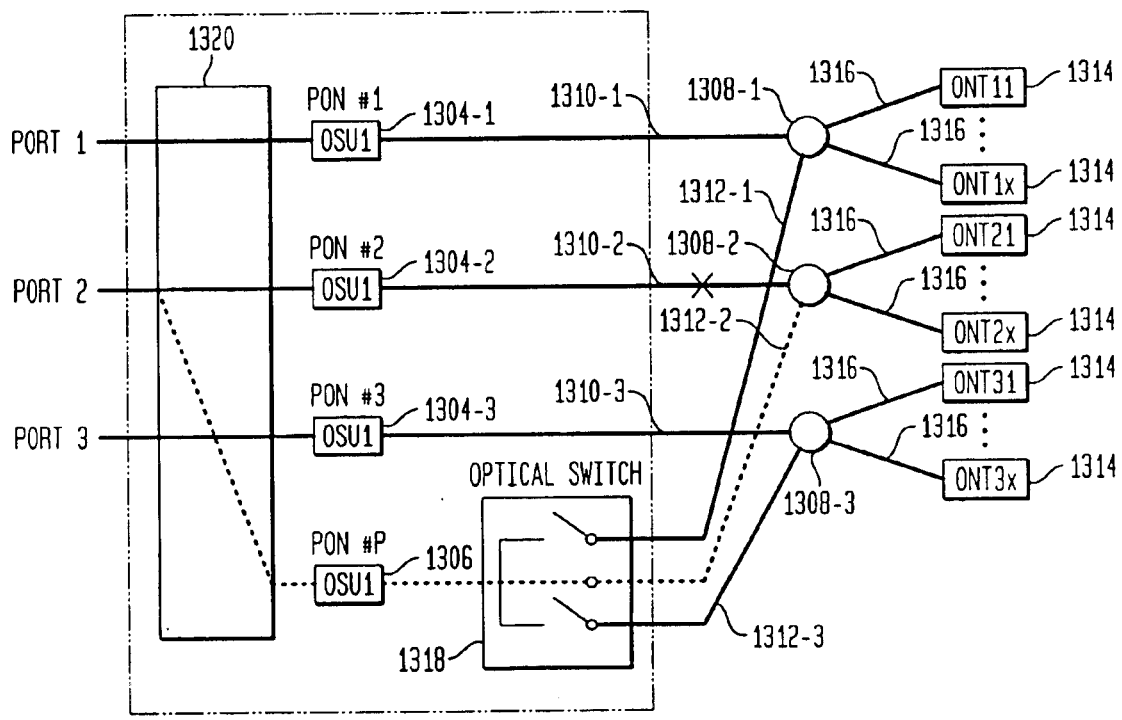
FIG. 12 shows a block diagram of a 1:N protection switching architecture in which a single protection circuit is used to protect three different passive optical networks.

FIG. 12 shows a block diagram of a 1:N protection switching architecture in which a single protection circuit (PON #P) is used to protect three different passive optical networks (PONs #1, #2, and #3). The architecture of FIG. 12 is the 1:3 analog to the 1:1 protection switching architecture shown in FIG. 4. As shown in FIG. 12, each working PON #i comprises a working OSU 1304-$i$ connected via a bi-directional working optical fiber 1310-$i$ to an unprotected passive optical splitter 1308-$i$, which is in turn connected via a plurality of unprotected bi-directional optical fibers 1316-$ij$ to a plurality of unprotected ONTs 1314-$ij$.

Protection circuit PON #P comprises a protection OSU 1306 connected to a 1:3 optical switch 1318, which is in turn connected to each passive optical splitter 1308-$i$ by a corresponding protection optical fiber 1312-$i$. In addition, protection OSU 1306 and each of the working OSUs 1304 are connected to a 3:4 optical switch 1320. During normal operations in which all three working circuits are functional, optical switch 1320 is configured to connect OSU 1304-1 of PON #1 to Port 1, OSU 1304-2 of PON #2 to Port 2, and OSU 1304-3 of PON #3 to Port 3.

As far as protection switching is concerned, upon detection of a failure in any one of the three working circuits (e.g., a cut in fiber 1310-2 of PON #2 as indicated in FIG. 12), optical switches 1318 and 1320 will be reconfigured to connect protection OSU 1306 of PON #P to both the corresponding port (e.g., Port 2 in the example indicated in FIG. 12) and the corresponding splitter (e.g., splitter 1308-2 in the example indicated in FIG. 12).

Optical switch 1318 also enables each of the techniques described in the previous sections to be implemented in the context of the 1:N architecture of FIG. 12. In particular, by controlling optical switch 1318 over time to connect protection OSU 1306 to each optical splitter 1308-*i*, each of the previously described techniques can eventually be performed for each of the different working circuits. Note that all N working OSUs 1304 and protection OSU 1306 should be frame synchronized in the manner described in the previous sections.

If the protection circuit is already configured in the network when the working circuits are to perform their ranging procedures, then fast ranging in the event of a protection switch can be enabled by the protection OSU snooping during each working OSU's ranging procedure, using the procedure described previously. The only requirement is that the different working OSUs perform their ranging procedures sequentially. In that case, optical switch 1318 is re-configured to connect protection OSU 1306 to the corresponding optical splitter 1308-*i* prior to the implementation of the ranging procedure by working OSU 1304-*i*.

In the case of a hot plug-in situation where the protection circuit is configured into the network after the various working OSUs have already performed their normal ranging procedures, then fast ranging in the event of a protection switch can be enabled by the protection OSU snooping on routine PLOAM cells, using the procedure described previously. Here, optical switch 1318 is sequentially configured to connect protection OSU 1306 to each optical splitter 1308-*i* to perform snooping on PLOAM cells for the corresponding working circuit before moving on to the next working circuit.

In either case, a different D2 value is determined for each working circuit and saved for use in the event of a protection switch, in which case, the appropriate D2 value will be used to perform fast ranging by the protection OSU for the corresponding set of ONTs.

After performing snooping using either technique, optical switch 1318 can also be sequentially configured to perform the on-line health check algorithm described previously to verify both the correct functioning of the BMR in protection OSU 1306 as well as the integrity of each optical fiber 1312-*i* connecting optical switch 1318 to a corresponding optical splitter 1308-*i*.

Fast Protection Ranging for Protected ONTs

In the previous sections, fast protection ranging has been enabled for configurations based on the protection architecture of FIG. 4, in which the protection circuit involves the path from the splitter to the OSU, but not the path from the splitter to the ONTs. In particular, the two snooping techniques described previously measure propagation differences only between working and protection paths that are provided between an optical splitter and a protected OSU. This section describes a technique for measuring propagation differences between working and protection paths that are provided between the optical splitter and each protected ONT, in order to extend the fast protection ranging procedures to configurations based on the protection architecture of FIG. 5.

For the present technique, the transmitter and receiver of the working line termination (LT) unit of a protected ONT are both turned on, but only the receiver of the protection LT unit is on, not the protection transmitter.

The present technique is analogous to the procedure described previously for snooping on upstream PLOAM cells, except that, in this case, the snooping is performed on downstream PLOAM cells. Initially, bit-level synchronization is achieved between the working and protection LT units of an ONT using a counter, as described in a previous section. The difference in arrival times of a specific downstream PLOAM cell at both the working and protection LT units is then measured. Note that 2N:2 optical splitter 508 of FIG. 5 transmits a copy of each downstream cell to each of the working and protection LT units.

This snooping technique can be combined with the snooping techniques described previously to enable fast ranging to be performed during protection switching in the context of the protection architecture of FIG. 5. This approach assumes that the N:2 and 2:1 splitters that are used to make splitter 508 are physically co-located such that the differences in distances between the various component splitters are minimal, or at least smaller than the window size of the BMR.

Figure 13:
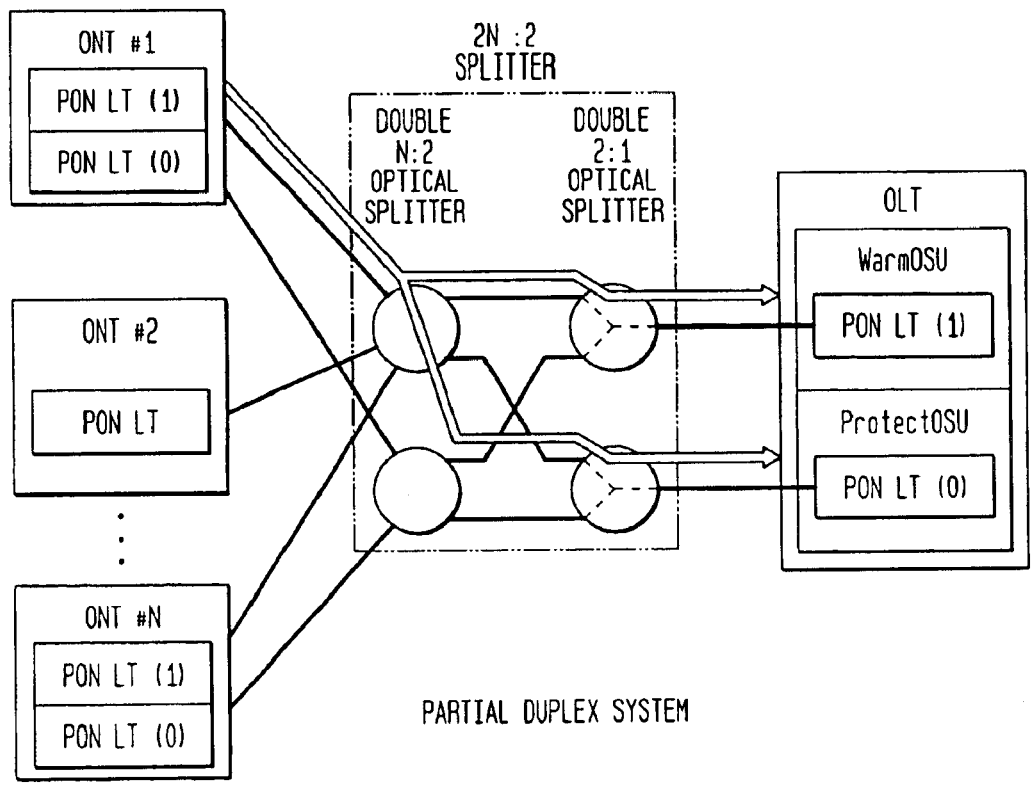
FIG. 13 shows a representation of the protection architecture of FIG. 5 indicating the characterization of the differences in propagation delay between the optical splitter and the protected OSU.

FIG. 13 shows a representation of the protection architecture of FIG. 5 indicating the characterization of the differences in propagation delay between the optical splitter and the protected OSU. This characterization can be achieved using either of the snooping procedures described in the previous sections.

Figure 14:
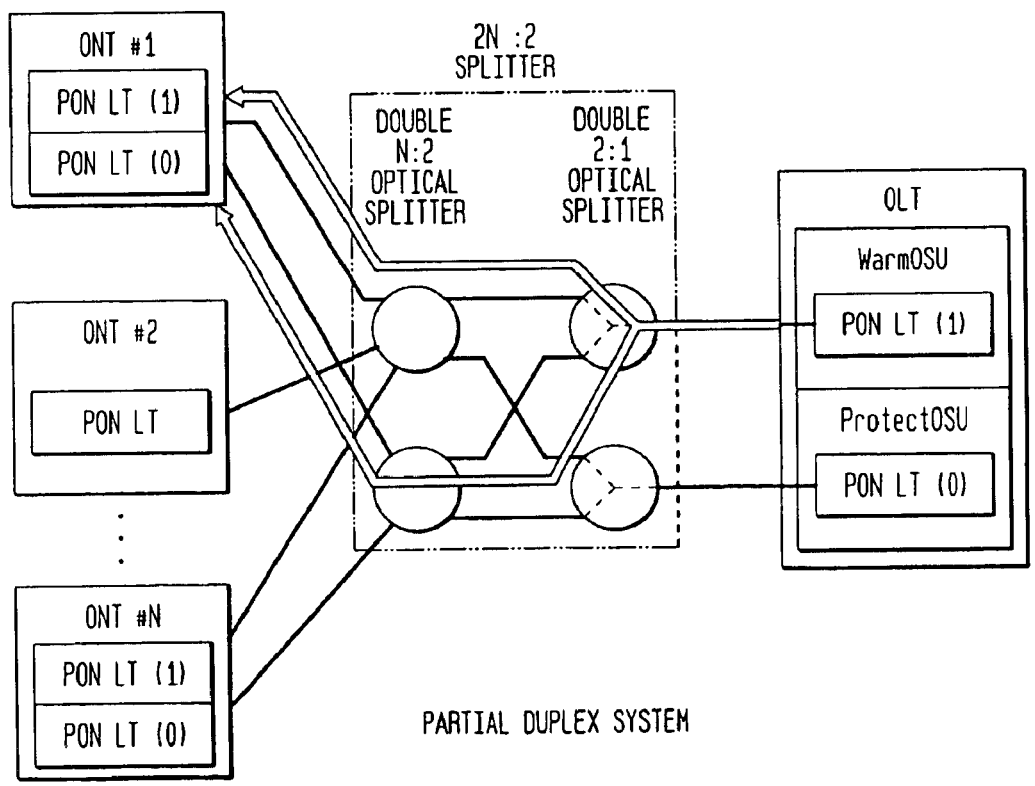
FIG. 14 shows a representation of the protection architecture of FIG. 5 indicating the characterization of the differences in propagation delay between the optical splitter and a protected ONT.

FIG. 14 shows a representation of the protection architecture of FIG. 5 indicating the characterization of the differences in propagation delay between the optical splitter and a protected ONT. This characterization can be achieved using the snooping procedure described in this section.

The two different propagation delay values determined using the procedures indicated in FIGS. N and O provide the OLT with knowledge of the differences in the various paths from either the working OSU or the protection OSU to either the working LT unit or the protection LT unit of the protected ONT. Note that use of this approach in the context of existing ITU-T G.983.1 systems would require the definition of an additional upstream message for communicating to the OSU the value of the difference in propagation delay between the working and protection paths between the splitter and each protected ONT.

The propagation delay value measured using the present technique corresponds to the downstream direction. To estimate the total round-trip time delay, the propagation delay value should be properly scaled taking into account any differences in wavelength between the upstream and downstream channels, similar to the scaling described earlier in the context of the other snooping procedures.

Although the present invention has been described in the context of ATM-PON networks conforming to the G.983.1 recommendation in which all data is sent in an ATM cell format of 53 bytes downstream and 56 bytes upstream, those skilled in the art will understand that the present invention can be implemented in the context of other fixed-sized packet-based optical networks that use TDMA and ranging for upstream transmission including possibly non-passive optical networks.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. In an optical network comprising an optical splitter connected to (1) a working optical subscriber unit (OSU) of a working circuit via a working optical fiber, (2) a protection OSU of a protection circuit via a protection optical fiber, and (3) one or more optical network terminals (ONTs), a method for enabling fast protection switching from the working OSU to the protection OSU, comprising the steps of:
   (a) synchronizing the working and protection OSUs;
   (b) initiating a cell delineation procedure at the protection OSU during normal, non-ranging operations of the working OSU to enable the protection OSU to correctly delineate upstream cells;
   (c) measuring arrival times of corresponding upstream cells at both the working and protection OSUs; and
   (d) generating a propagation delay value based on the arrival times for use by the protection OSU for communications with the one or more ONTs if and when protection switching is implemented upon detection of a failure in the working circuit, wherein the optical network further comprises:
   one or more additional working OSUs, each connected via an additional working optical fiber to an additional optical splitter, which is further connected to one or more additional ONTs; and
   an optical switch connected to each of the optical splitters via a protection optical fiber and to the protection OSU, wherein the optical switch is controlled to sequentially connect the protection OSU to each of the optical splitters to implement steps (a) through (d) to generate a different propagation delay value for each working OSU for use by the protection OSU in ranging the one or more ONTs corresponding to a particular working OSU if and when protection switching is implemented upon detection of a failure in the working circuit corresponding to the particular working OSU.

2. The invention of claim 1, wherein the optical splitter is a passive optical splitter and the optical network conforms to ITU-T Recommendation G.983.1.

3. The invention of claim 1, wherein the corresponding upstream cells are upstream PLOAM cells that are not associated with ranging by a working OSU.

4. The invention of claim 1, wherein a propagation delay value is generated taking into account differences in upstream and downstream transmission speeds that result from different upstream and downstream transmission wavelengths.

5. The invention of claim 1, wherein the protection OSU is added to the optical network after a working OSU has completed ranging for the one or more ONTs.

6. The invention of claim 1, wherein the cell delineation procedure is implemented using a state machine comprising:
   (A) a hunt state wherein different timing positions are used for different BMR reset pulses;
   (B) a presync state wherein a single timing position is used for different BMR reset pulses; and
   (C) a sync state wherein a single timing position is used for different BMR reset pulses, wherein:
      (i) a state transition from the hunt state to the presync state occurs as soon as a first specified number of valid sets of data are identified;
      (ii) a state transition from the presync state to the hunt state occurs as soon as a second specified number of invalid sets of data are identified;
      (iii) a state transition from the presync state to the sync state occurs after a third specified number of consecutive valid sets of data are identified; and
      (iv) a state transition from the sync state to the hunt state occurs after a fourth specified number of consecutive invalid sets of data are identified.

7. The invention of claim 6, wherein the first and second specified numbers are both 1.

8. The invention of claim 1, wherein ranging is not required to be performed by the protection OSU after the protection switching in order to support the communications with the one or more ONTs.

9. The invention of claim 1, wherein step (a) comprises the step of synchronizing frame counters at the working and protection OSUs.

10. A machine-readable medium, having encoded thereon program code, wherein, when the program code is executed by a machine, the machine implements, in an optical network comprising an optical splitter connected to (1) a working optical subscriber unit (OSU) of a working circuit via a working optical fiber, (2) a protection OSU of a protection circuit via a protection optical fiber, and (3) one or more optical network terminals (ONTs), a method for enabling fast protection switching from the working OSU to the protection OSU, comprising the steps of:
   (a) synchronizing the working and protection OSUs;
   (b) initiating a cell delineation procedure at the protection OSU during normal, non-ranging operations of the working OSU to enable the protection OSU to correctly delineate upstream cells;
   (c) measuring arrival times of corresponding upstream cells at both the working and protection OSUs; and
   (d) generating a propagation delay value based on the arrival times for use by the protection OSU for communications with the one or more ONTs if and when protection switching is implemented upon detection of a failure in the working circuit, wherein the optical network further comprises:
   one or more additional working OSUs, each connected via an additional working optical fiber to an additional optical splitter, which is further connected to one or more additional ONTs; and
   an optical switch connected to each of the optical splitters via a protection optical fiber and to the protection OSU, wherein the optical switch is controlled to sequentially connect the protection OSU to each of the optical splitters to implement steps (a) through (d) to generate a different propagation delay value for each working OSU for use by the protection OSU in ranging the one or more ONTs corresponding to a particular working OSU if and when protection switching is implemented upon detection of a failure in the working circuit corresponding to the particular working OSU.

11. The invention of claim 10, wherein the optical splitter is a passive optical splitter and the optical network conforms to ITU-T Recommendation G.983.1.

12. The invention of claim 10, wherein the corresponding upstream cells are upstream PLOAM cells that are not associated with ranging by a working OSU.

13. The invention of claim 10, wherein a propagation delay value is generated taking into account differences in upstream and downstream transmission speeds that result from different upstream and downstream transmission wavelengths.

14. The invention of claim 10, wherein the protection OSU is added to the optical network after a working OSU has completed ranging for the one or more ONTs.

15. The invention of claim 10, wherein the cell delineation procedure is implemented using a state machine comprising:
  (A) a hunt state wherein different timing positions are used for different BMR reset pulses;
  (B) a presync state wherein a single timing position is used for different BMR reset pulses; and
  (C) a sync state wherein a single timing position is used for different BMR reset pulses, wherein:
    (i) a state transition from the hunt state to the presync state occurs as soon as a first specified number of valid sets of data are identified;
    (ii) a state transition from the presync state to the hunt state occurs as soon as a second specified number of invalid sets of data are identified;
    (iii) a state transition from the presync state to the sync state occurs after a third specified number of consecutive valid sets of data are identified; and
    (iv) a state transition from the sync state to the hunt state occurs after a fourth specified number of consecutive invalid sets of data are identified.

16. The invention of claim 15, wherein the first and second specified numbers are both 1.

17. The invention of claim 10, wherein ranging is not required to be performed by the protection OSU after the protection switching in order to support the communications with the one or more ONTs.

18. The invention of claim 10, wherein step (a) comprises the step of synchronizing frame counters at the working and protection OSUs.

19. In an optical network comprising an optical splitter connected to (1) a working optical subscriber unit (OSU) of a working circuit via a working optical fiber, (2) a protection OSU of a protection circuit via a protection optical fiber, and (3) one or more optical network terminals (ONTs), a method for enabling fast protection switching from the working OSU to the protection OSU, comprising the steps of:
  (a) synchronizing the working and protection OSUs;
  (b) initiating a cell delineation procedure at the protection OSU during normal, non-ranging operations of the working OSU to enable the protection OSU to correctly delineate upstream cells;
  (c) measuring arrival times of corresponding upstream cells at both the working and protection OSUs; and
  (d) generating a propagation delay value based on the arrival times for use by the protection OSU for communications with the one or more ONTs if and when protection switching is implemented upon detection of a failure in the working circuit, wherein the cell delineation procedure is implemented using a state machine comprising:
  (A) a hunt state wherein different timing positions are used for different BMR reset pulses;
  (B) a presyne state wherein a single timing position is used for different BMR reset pulses; and
  (C) a sync state wherein a single timing position is used for different BMR reset pulses, wherein:
    (i) a state transition from the hunt state to the presync state occurs as soon as a first specified number of valid sets of data are identified;
    (ii) a state transition from the presync state to the hunt state occurs as soon as a second specified number of invalid sets of data are identified;
    (iii) a state transition from the presync state to the sync state occurs after a third specified number of consecutive valid sets of data are identified; and
    (iv) a state transition from the sync state to the hunt state occurs after a fourth specified number of consecutive invalid sets of data are identified.

20. The invention of claim 19, wherein the first and second specified numbers are both 1.

21. A machine-readable medium, having encoded thereon program code, wherein, when the program code is executed by a machine, the machine implements, in an optical network comprising an optical splitter connected to (1) a working optical subscriber unit (OSU) of a working circuit via a working optical fiber, (2) a protection OSU of a protection circuit via a protection optical fiber, and (3) one or more optical network terminals (ONTs), a method for enabling fast protection switching from the working OSU to the protection OSU, comprising the steps of:
  (a) synchronizing the working and protection OSUs;
  (b) initiating a cell delineation procedure at the protection OSU during normal, non-ranging operations of the working OSU to enable the protection OSU to correctly delineate upstream cells;
  (c) measuring arrival times of corresponding upstream cells at both the working and protection OSUs; and
  (d) generating a propagation delay value based on the arrival times for use by the protection OSU for communications with the one or more ONTs if and when protection switching is implemented upon detection of a failure in the working circuit, wherein the cell delineation procedure is implemented using a state machine comprising:
  (A) a hunt state wherein different timing positions are used for different BMR reset pulses;
  (B) a presync state wherein a single timing position is used for different BMR reset pulses; and
  (C) a sync state wherein a single timing position is used for different BMR reset pulses, wherein:
    (i) a state transition from the hunt state to the presync state occurs as soon as a first specified number of valid sets of data are identified;
    (ii) a state transition from the presync state to the hunt state occurs as soon as a second specified number of invalid sets of data are identified;
    (iii) a state transition from the presync state to the sync state occurs after a third specified number of consecutive valid sets of data are identified; and
    (iv) a state transition from the sync state to the hunt state occurs after a fourth specified number of consecutive invalid sets of data are identified.

22. The invention of claim 21, wherein the first and second specified numbers are both 1.

* * * * *